United States Patent [19]

Pattin et al.

[11] Patent Number: 5,745,913

[45] Date of Patent: Apr. 28, 1998

[54] MULTI-PROCESSOR DRAM CONTROLLER THAT PRIORITIZES ROW-MISS REQUESTS TO STALE BANKS

[75] Inventors: Jay C. Pattin, Redwood City; James S. Blomgren, San Jose, both of Calif.

[73] Assignee: Exponential Technology, Inc., San Jose, Calif.

[21] Appl. No.: 691,005

[22] Filed: Aug. 5, 1996

[51] Int. Cl.$^6$ ........................................... G06F 12/00
[52] U.S. Cl. ..................... 711/105; 711/111; 395/413; 395/405; 364/DIG. 1
[58] Field of Search ..................... 365/230.01; 395/405, 395/413, 438, 432

[56] References Cited

U.S. PATENT DOCUMENTS

| | | | |
|---|---|---|---|
| 5,051,889 | 9/1991 | Fung et al. | 364/200 |
| 5,265,236 | 11/1993 | Mehring et al. | 395/413 |
| 5,269,010 | 12/1993 | MacDonald | 395/405 |
| 5,280,571 | 1/1994 | Keith et al. | 395/143 |
| 5,289,584 | 2/1994 | Thome et al. | 395/325 |
| 5,301,287 | 4/1994 | Herrell et al. | 395/400 |
| 5,301,292 | 4/1994 | Hilton et al. | 395/425 |
| 5,307,320 | 4/1994 | Farrer et al. | 365/230.01 |
| 5,353,416 | 10/1994 | Olson | 395/325 |
| 5,357,606 | 10/1994 | Adams | 395/164 |
| 5,392,239 | 2/1995 | Margulis et al. | 365/189.01 |
| 5,392,436 | 2/1995 | Jansen et al. | 395/725 |
| 5,412,788 | 5/1995 | Collins et al. | 395/425 |
| 5,438,666 | 8/1995 | Craft et al. | 395/842 |
| 5,440,752 | 8/1995 | Lentz et al. | 395/800 |
| 5,448,702 | 9/1995 | Garcia, Jr. et al. | 395/325 |
| 5,450,564 | 9/1995 | Hassler et al. | 395/495 |
| 5,479,640 | 12/1995 | Cartman et al. | 395/438 |
| 5,481,691 | 1/1996 | Day, III et al. | 395/425 |
| 5,481,707 | 1/1996 | Murphy Jr. et al. | 395/650 |
| 5,495,339 | 2/1996 | Stegbauer et al. | 358/296 |
| 5,604,884 | 2/1997 | Thome et al. | 395/494 |

OTHER PUBLICATIONS

IBM 16 Mbit Synchronous DRAM Databook, IBM0316409C, pp. 1–100, Jan. 1996.

*Primary Examiner*—Tod R. Swann
*Assistant Examiner*—David Langjahr
*Attorney, Agent, or Firm*—Stuart T. Auvinen

[57] ABSTRACT

Memory requests from multiple processors are re-ordered to maximize DRAM row hits and minimize row misses. Requests are loaded into a request queue and simultaneously decoded to determine the DRAM bank of the request. The last row address of the decoded DRAM bank is compared to the row address of the new request and a row-hit bit is set in the request queue if the row addresses match. The bank's state machine is consulted to determine if RAS is low or high, and a RAS-low bit in the request queue is set if RAS is low and the row still open. A row counter is reset for every new access but is incremented with a slow clock while the row is open but not being accessed. After a predetermined count, the row is considered "stale". A stale-row bit in the request queue is set if the decoded bank has a stale row. A request prioritizer reviews requests in the request queue and processes row-hit requests first, then row misses which are to a stale row. Lower in priority are row misses to non-stale rows which have been more recently accessed. Requests loaded into the request queue before the cache has determined if a cache hit has occurred are speculative requests and can open a new row when the old row is stale or closed.

19 Claims, 8 Drawing Sheets

```
CLOCK CYCLES
0 1 2 3 4 5 6 7 8 9 10 12 14 16 18 20 22 24 26 28 30 32

P - - R - - C - - 0 1 2 3         P - - R - - C - - 0 1 2 3
CASE (A)

P - - R - - A - - 0 1 2 3         R - - A - - 0 1 2 3
CASE (B)

P - - R - - C - - 0 1 2 3         C - - 0 1 2 3         C - - 0 1 2 3         C - - 0 1 2 3
CASE (C)

P - - R - - C - - 0 1 2 3         - - - - - - - -         P                 
                                                          R - - C - - 0 1 2 3
CASE (D)
```

MULTI-PROCESSOR DRAM CONTROLLER THAT PRIORITIZES ROW-MISS REQUESTS TO STALE BANKS

BACKGROUND OF THE INVENTION—FIELD OF THE INVENTION

This invention relates to multi-processor systems, and more particularly for DRAM controllers which re-order requests from multiple sources.

BACKGROUND OF THE INVENTION— DESCRIPTION OF THE RELATED ART

Multi-processor systems are constructed from one or more processing elements. Each processing element has one or more processors, and a shared cache and/or memory. These processing elements are connected to other processing elements using a scaleable coherent interface (SCI). SCI provides a communication protocol for transferring memory data between processing elements. A single processing element which includes SCI can later be expanded or upgraded.

An individual processing element typically contains two to four central processing unit (CPU) cores, with a shared cache. The shared cache is connected to an external memory for the processing element. The external memory is constructed from dynamic RAM (DRAM) modules such as single-inline memory modules (SIMMs). The bandwidth between the shared cache and the external memory is critical and can limit system performance.

Standard DRAM controllers for uni-processors have been available commercially and are well-known. However, these controllers, when used for multi-processor systems, do not take advantage of the fact that multiple processors generate the requests to the external memory. Often requests from different processors can be responded to in any order, not just the order received by the memory controller. Unfortunately, DRAM controllers for uni-processor systems do not typically have the ability to re-order requests. Thus standard DRAM controllers are not optimal for multi-processor systems.

Synchronous DRAMs are becoming available which provide extended features to optimize performance. The row can be left open, allowing data to be accessed by pulsing CAS without pulsing RAS again. Many CAS-only cycles can be performed once the row address has been strobed into the DRAM chips and the row left active. Burst cycles can also be performed where CAS is strobed once while data that sequentially follows the column address is bursted out in successive clock cycles.

What is desired is a DRAM controller which is optimized for a multi-processor system. It is desired to re-order requests from different CPU cores in an optimal fashion to increase bandwidth to the external DRAM memory. It is also desired to use burst features of newer synchronous DRAMs to further increase bandwidth.

SUMMARY OF THE INVENTION

A memory controller accesses an external memory in response to requests from a plurality of general-purpose processors. The memory has a plurality of bank controllers. Each bank controller accesses a bank of the external memory. Each bank controller has a state machine for sequencing control signals for timing access of the external memory. The state machine outputs a row-address-strobe RAS-active indication of a logical state of a RAS signal line coupled to the bank of the external memory. A row address register stores a last row address of a last-accessed row of the bank of the external memory.

A counter includes reset means for resetting the counter upon completion of a data-transfer access to the bank of the external memory. The counter periodically increments when the row is active and no data-transfer access occurs. The counter outputs a stale-row indication when a count from the counter exceeds a predetermined count.

A request queue stores requests from the plurality of general-purpose processors for accessing the external memory. The request queue stores row-status bits including:

a) a row-hit indication when the last row address matches a row address of a request, b) the row-active indication from the state machine, and c) the stale-row indication from the counter.

A request prioritizer is coupled to the request queue. It determines a next request from the request queue to generate a data-transfer access to the external memory. The request prioritizer re-orders the requests into an order other than the order the requests are loaded into the request queue. Thus requests from the plurality of processors are reordered for accessing the external memory.

In further aspects of the invention the counter is incremented by a slow clock having a frequency divided down from a memory clock for incrementing the state machine when the row line is active and no data-transfer access occurs, but the counter is incremented by the memory clock during the data-transfer access. Thus the counter increments more slowly when no data-transfer occurs than when a data-transfer access is occurring.

In further aspects the predetermined count for determining the stale row indication is programmable. The request prioritizer re-orders requests having the stale-row indication before requests not having the stale-row indication when no requests have the row-hit indication. Thus miss requests to stale rows are processed before miss requests to more-recently-accessed rows.

BRIEF DESCRIPTION OF THE DRAWINGS

FIG. 8 is a timing diagram of SDRAM accesses using normal and auto-precharge.

DETAILED DESCRIPTION

The present invention relates to an improvement in embedded DRAM controllers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
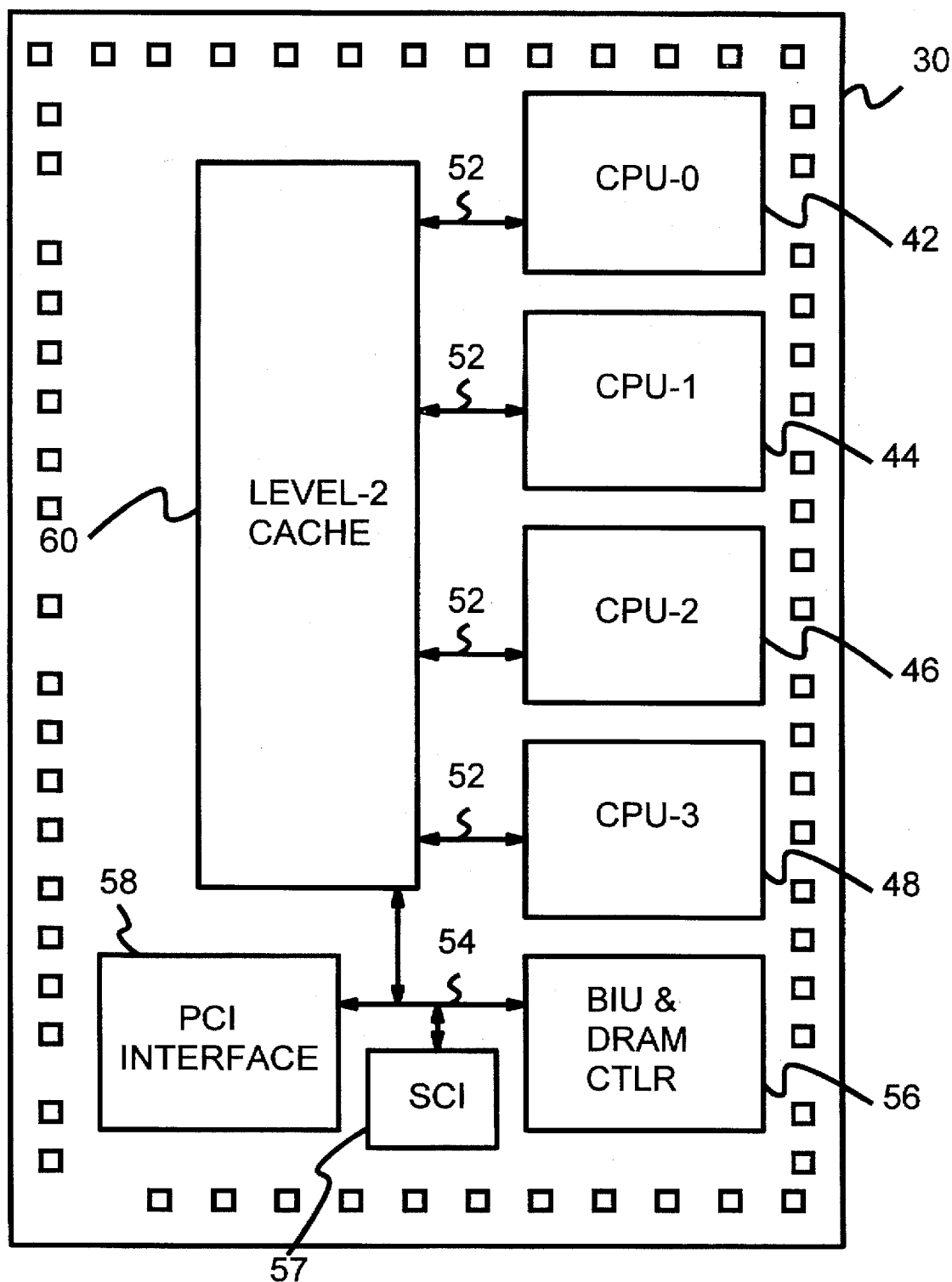
FIG. 1 is a diagram of a multi-processor chip which connects to an external memory bus.

Multi-Processor Die—FIG. 1

FIG. 1 is a diagram of a multi-processor chip for connecting to an external memory bus. Four CPU cores 42, 44, 46, 48 each contain one or more execution pipelines for fetching, decoding, and executing general-purpose instructions. Each CPU core has a level-one primary cache. Operand or instruction fetches which miss in the primary cache are requested from the larger second-level cache 60 by sending a request on internal bus 52.

CPU cores 42, 44, 46, 48 may communicate with each other by writing and reading data in second-level cache 60 without creating traffic outside of chip 30 on the external memory bus. Thus inter-processor communication is sometimes accomplished without external bus requests. However, communication to other CPU's on other dies do require external cycles on the memory bus.

Requests from CPU cores 42, 44, 46, 48 which cannot be satisfied by second-level cache 60 include external DRAM requests and PCI bus requests such as input-output and peripheral accesses. PCI requests are transferred from second-level cache 60 to PCI interface 58, which arbitrates for control of PCI bus 28, using PCI-specific arbitration signals. Bus 54 connects second-level cache 60 to PCI interface 58 and BIU 56.

Memory requests which are mapped into the address space of the DRAMs rather than the PCI bus are sent from second-level cache 60 to bus-interface unit (BIU) 56. BUI 56 contains a DRAM controller so that DRAM signals such as chip-select (CS), RAS, CAS, and the multiplexed row/ column address are generated directly rather than by an external DRAM controller chip connected to a local bus. Communication to the other processors is accomplished through scaleable-coherent interface SCI 57, which transfers data to other processing elements (not shown).

DRAM Access Requirements

The cost of a DRAM chip is typically reduced by multiplexing the row and column addresses to the same input pins on a DRAM package. A row-address strobe (RAS) is asserted to latch the multiplexed address as the row address, which selects one of the rows in the memory array within the DRAM chip. A short period of time later a column-address strobe (CAS) is strobed to latch in the column address, which is the other half of the full address. Accessing DRAM thus requires that the full address be divided into a row address and a column address. The row address and the column address are strobed into the DRAM chip at different times using the same multiplexed-address pins on the DRAM chip.

DRAM manufacturers require that many detailed timing specifications be met for the RAS and CAS signals and the multiplexed address. At the beginning of an access, the RAS signal must remain inactive for a period of time known as the row or RAS precharge period. This often requires several clock periods of a processor's clock. After RAS precharge has occurred, the row address is driven out onto the multiplexed address bus and RAS is asserted. Typically the row address must be driven one or more clock periods before RAS is asserted to meet the address set-up requirement. Then the column address is driven to the multiplexed address bus and CAS is asserted.

For synchronous DRAMs, a burst mode is used where CAS is pulsed before the data is read out of the DRAM chip. On successive clock periods, a burst of data from successive memory locations is read out. CAS is not re-asserted for each datum in the burst. The internal row is left asserted during this time although the external RAS signal may have become inactive. CAS may then be asserted again with a different column address when additional bursts of data have the same row address but different column addresses. Indeed, a row address may be strobed in once followed by dozens or hundreds of CAS-only bursts. The internal row is left asserted as long as possible, often until the next refresh occurs. This is sometimes referred to as page-mode. Since a typical multiplexed address has 11 or more address bits, each row address or "page" has at least $2^{11}$ or 2048 unique column addresses.

When the arbitration logic for DRAM access determines that the current access is to a row that is not requested by any other CPU's, then a row precharge is performed upon completion of requests to the row when other requests are outstanding to other rows in the bank. This reduces latency to these other rows.

The row address is typically the higher-order address bits while the column address is the lowest-order address bits. This address partition allows a single row to contain 2K or more contiguous bytes which can be sequentially accessed without the delay to strobe in a new row address and precharge the row. Since many computer programs exhibit locality, where memory references tend to be closer rather than farther away from the last memory reference, the DRAM row acts as a small cache.

The DRAM is arranged into multiple banks, with the highest-order address bits being used to determine which bank is accessed. Sometimes lower-order address bits, especially address bits between the row and column address bits, are used as bank-select bits. See "Page-interleaved memory access", U.S. Pat. No. 5,051,889 by Fung et al., assigned to Chips and Technologies, Inc. of San Jose Calif. Each DRAM bank acts as a separate row-sized cache, reducing access time by avoiding the RAS precharge and strobing delay for references which match a row address of an earlier access.

A synchronous DRAM adds a chip-select (CS) and a clock signal to the standard set of DRAM pins. The multiplexed address, and the RAS, CAS, and WE control signals are latched into the DRAM chip when CS is active on a rising edge of the clock. Thus RAS, CAS, and WE are ignored when the chip-select signal is inactive. The internal row may be activated by having RAS and CS low on a rising clock edge. The row remains activated when RAS becomes inactive as long as CS remains inactive to that DRAM chip. Other rows in other DRAM chips may then be activated by asserting a separate CS to these other DRAM chips. Normally the multiplexed address and the RAS, CAS, WE control signals are shared among all banks of DRAMs, but each bank gets a separate chip-select. Only the bank having the active chip-select signal latches the shared RAS, CAS, WE signals; the other banks with CS inactive simply ignore the RAS, CAS, WE signals.

Figure 2:
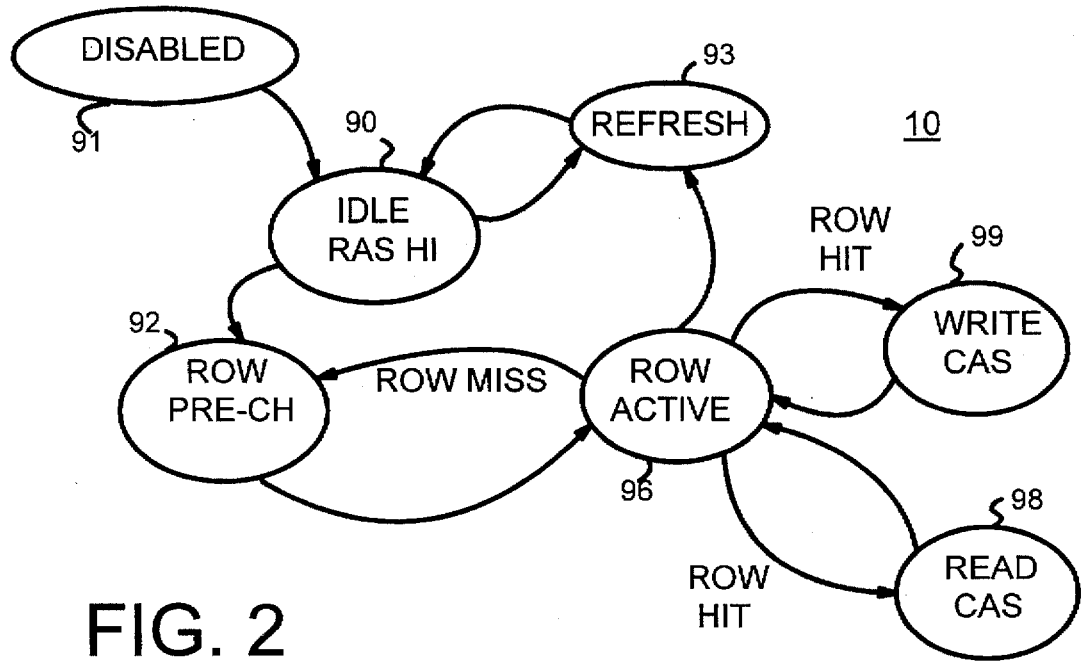
FIG. 2 is a diagram of a state machine for accessing a dynamic random-access memory (DRAM) bank using page-mode access.

Page-Mode DRAM State Machine—FIG. 2

FIG. 2 is a diagram of a state machine for accessing a dynamic random-access memory (DRAM) bank using page-mode access. A copy of DRAM state machine 10 is provided for each bank of DRAM which is to be separately accessed. Some DRAM banks may be disabled, indicated by disabled state 91 which cannot be exited without re-configuring the memory. Idle state 90 is first entered; the row is not yet activated. Row precharge state 92 is then entered; the row is still inactive. After a few clock periods have elapsed, the row or RAS precharge requirement has been met and RAS is asserted. Row active state 96 is then entered. CAS is then asserted for reads in state 98 and for writes in state 99. After the CAS cycle and any burst is completed, row active state 96 is re-entered and remains active until another access is requested.

Additional accesses that have the same row address are known as row hits, and simply assert CAS using states 98 or 99. When the row address does not match the row address of the last access, then a row miss occurs. Row precharge state 92 is entered, and the new row address is strobed in as RAS becomes active (falls) when entering state 96. Then the column address is strobed in states 98 or 99.

A timer is used to signal when a refresh is needed, and refresh state 93 is entered once any pending access is completed. Refresh is typically triggered by asserting CAS before the RAS signal, and a counter inside the DRAM chip increments for each refresh so that all rows are eventually refreshed.

These states can be encoded into a four-bit field known as the BANK_STATE, which can be read by other logic elements. Table 1 shows a simple encoding of these states into a 4-bit field.

TABLE 1

DRAM State Encoding

| BANK_STATE | Name | Reference No. |
| --- | --- | --- |
| 0000 | Idle, RAS High | 90 |
| 0001 | Row Precharge | 92 |
| 0011 | Row Active | 96 |
| 0100 | CAS Read | 98 |
| 0101 | CAS Write | 99 |
| 0111 | Refresh | 93 |
| 1111 | Not Installed | 91 |

Figure 3:
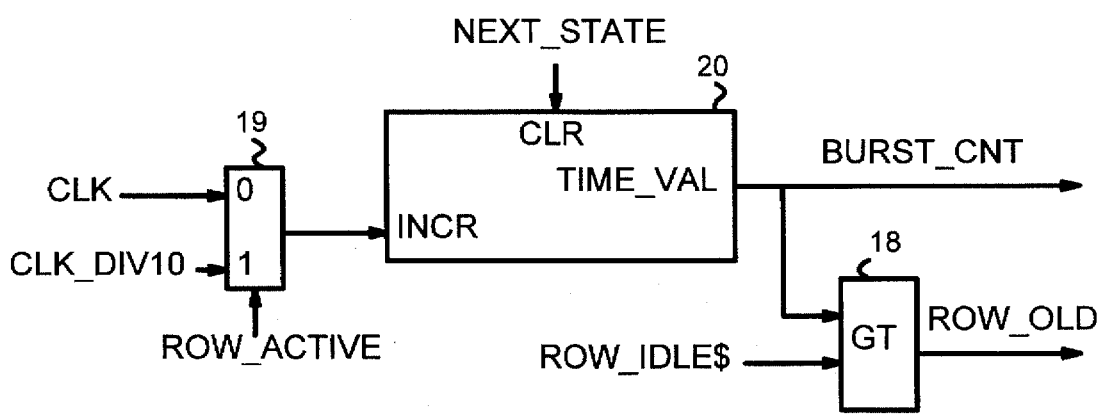
FIG. 3 is a diagram of a burst counter which is also used to indicate how long the current row has been open without being accessed.

Burst and Row Open Timer—FIG. 3

FIG. 3 is a diagram of a burst counter which is also used to indicate how long the current row has been open without being accessed. Row counter 12 is provided for each bank of DRAMs which is separately accessible. Counter 20 is a 4-bit binary upward-counter which increments for each rising edge of the increment clock input INCR. Once the maximum count of 1111 (15 decimal) is reached, the counter holds the terminal count rather than rolling over to zero.

Each time a new state is entered in DRAM state machine 10 of FIG. 2, NEXT_STATE is pulsed and counter 20 is cleared to 0000. Thus counter 20 counts the time that DRAM state machine 10 remains in any state.

The processor's memory clock CLK is selected by mux 19 for all states except row active state 96. When any state requires multiple clock cycles, counter 20 is used to keep count of the number of clock cycles in that state. For example, precharge may require 3 clock cycles. Row precharge state 92 clears counter 20 when first entered, and remains active until the count from counter 20 reaches two, which occurs during the third clock period of CLK. Once the count TIME_VAL output from counter 20 reaches two, row precharge state 92 may be exited and row active state 96 entered.

When bursting of data is enabled, counter 20 is also used as a burst counter. When read CAS state 98 is entered, counter 20 is incremented each clock period as the data is burst until the burst count is reached. Finally read CAS state 98 is exited once the desired burst count is reached. For a burst of four data items, four clock periods are required, while a burst of eight data items requires eight clock cycles.

CAS may be pipelined so that a new column address is strobed in while the last data item(s) in the previous burst are being read or written. A simple pipeline is used to delay the data transfer relative to the state machine. For a CAS latency of three cycles, the burst of data actually occurs three clock cycles after it is indicated by the burst counter. In that case, read CAS state 98 is exited three cycles before the burst completes.

Counter 20 is used in a second way for row active state 96. The second use of counter 20 is to keep track of the idle time since the last CAS cycle when RAS is low. Mux 19 selects the clock divided by ten, CLK_DIV10 during row active state 96 ROW_ACTIVE. This slower clock increments counter 20 at a slower rate. The slower rate is needed because row active state 96 may be operative for many cycles. In a sense, the DRAM bank is idle, but RAS has been left on for much of the time that row active state 96 is operative. Counter 20 can only count up to 15, so a fast clock would quickly reach the maximum count.

Counter 20 is slowly incremented by the divided-down clock CLK_DIV10. A programmable parameter ROW_IDLE$ is programmed into a system configuration register and may be adjusted by the system designer for optimum performance. Comparator 18 signals ROW_OLD when the count from counter 20 exceeds ROW_IDLE$, indicating that the row active state 96 has been active for longer than ROW_IDLE$ periods of CLK_DIV10.

ROW Open Counter Indicates Stale Rows

ROW_OLD is thus signaled when row active state 96 has been active for a relatively long period of time. No data transfers from this bank have occurred in that time, since another state such as read CAS state 98 would have been entered, clearing counter 20. ROW_OLD is an indication of how stale the open row is. Such information is useful when determining whether another reference is likely to occur to that open row. Once a long period of time has elapsed without any accesses to that row, it is not likely that future accesses will occur to this row. Rather, another row is likely to be accessed.

Another row is more likely to be accessed when ROW_OLD is active than when a shorter period of time has elapsed since the last access and ROW_OLD is not asserted. The priority of requests may be altered to lower the priority to a stale bank. Scheduling logic in the DRAM controller may examine ROW_OLD to determine when it is useful to close a row and begin RAS precharge for another access, even before another access is requested. This is known as a speculative precharge, when the stale row is closed, and the bank is pre-charged before an actual demand request arrives.

Figure 4:
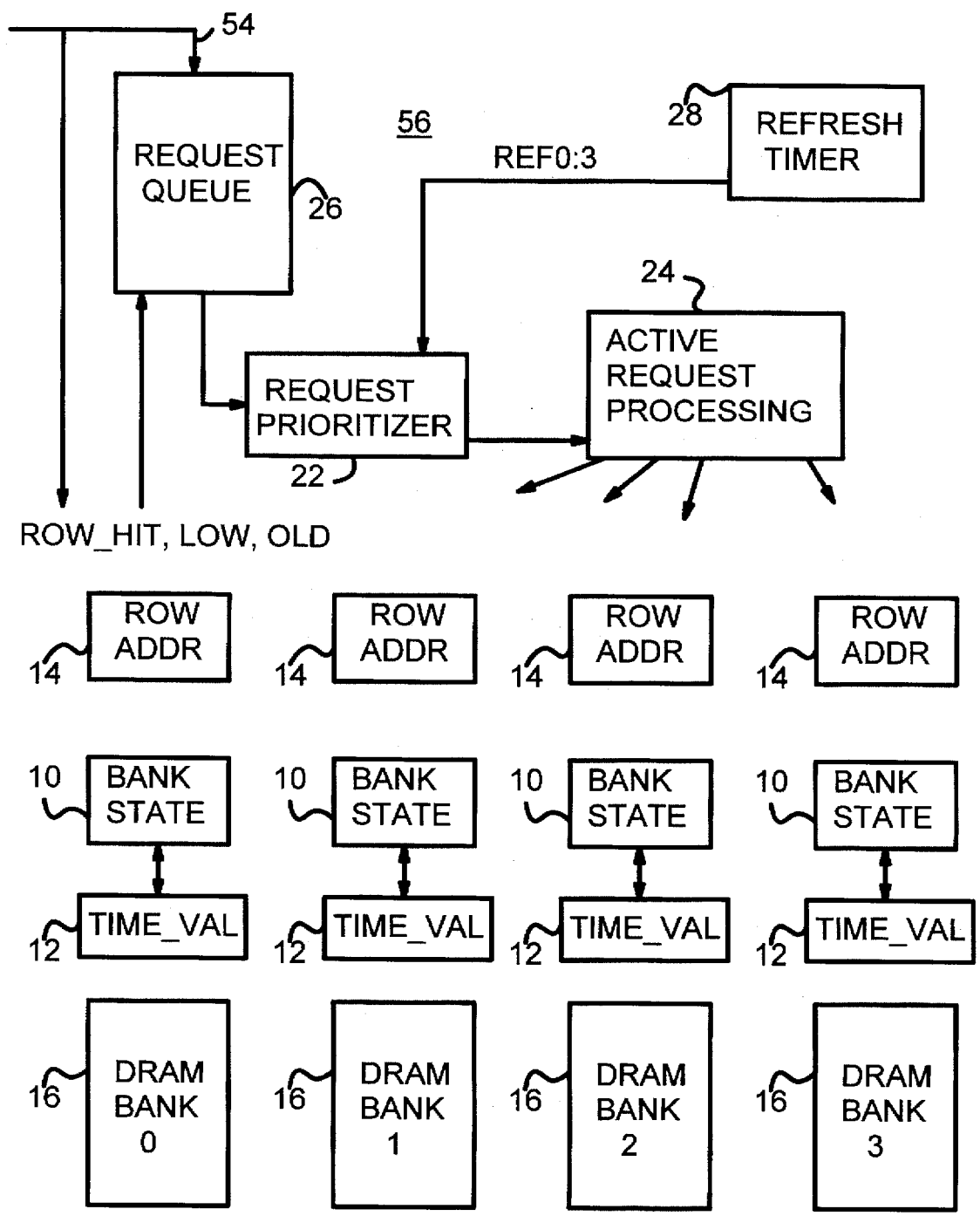
FIG. 4 is a diagram of a DRAM controller for separately accessing multiple banks of DRAM.

Multi-bank DRAM Controller—FIG. 4

FIG. 4 is a diagram of DRAM controller 56 for separately accessing multiple banks of DRAM. Four DRAM banks 16 are shown, although typically 8 or 16 banks may be supported by a simple extension of the logic shown. Each bank has its own DRAM state machine 10, as detailed in FIG. 2, and burst and row counter 12. Each bank also has its own row-address register 14 which contains a copy of the row address bits strobed into the DRAMs during the last row open when RAS was asserted.

Bus 54 transmits memory requests from any of the four CPU cores 42, 44, 46, 48 which missed in second-level cache 60 of FIG. 1, or PCI interface 58 or SCI 57. These requests are loaded into request queue 26 which are prioritized by request prioritizer 22 before being processed by request processor 24 which activates one of the DRAM state machines 10 for accessing one of the DRAM banks 16.

Refresh timer 28 is a free-running counter/timer which signals when a refresh is required, typically once every 0.1 msec. The different banks are refreshed in a staggered fashion to reduce the power surge when the DRAM is refreshed. Four refresh request signals REF0:3 are sent to request prioritizer 22 which begins the refresh as soon as any active requests which have already started have finished. Thus refresh is given the highest priority by request prioritizer 22.

As each new request is being loaded into request queue 26, the bank address is decoded and the row address is sent to row-address register 14 of the decoded bank to determine if the new request is to the same row-address as the last access of that bank. The DRAM state machine 10 of that bank is also consulted to determine if a requested row is active or inactive. The row counter is also checked to see if ROW_OLD has been asserted yet, indicating a stale row.

The results of the early query of the bank, the row-match indicator ROW_HIT, the DRAM state machine's current state of the row, ROW_ACTIVE, and RAS_LOW from the row counter, are sent to request queue 26 and stored with the request.

Figure 5:
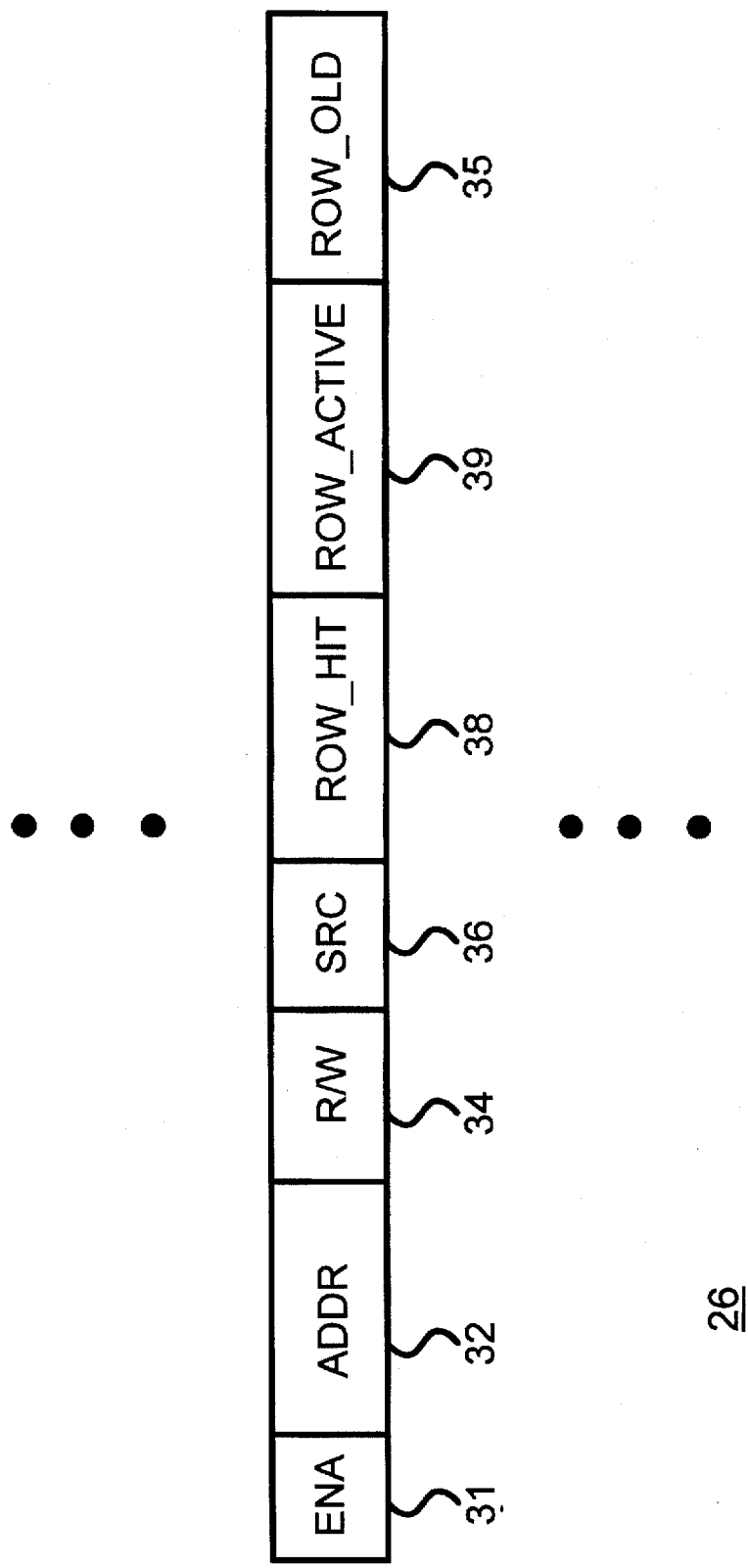
FIG. 5 is a diagram of the fields for a memory request in the request queue.

Request Queue Stores Row Hit, Count Status—FIG. 5

FIG. 5 is a diagram of the fields for a memory request in the request queue. Enable bit 31 is set when a new request is loaded into request queue 26, but cleared when a request has been processed by a DRAM state machine which accesses the external memory. The full address of the request, including the bank, row, column, and byte address is stored in address field 32. An alternative is to store just the decoded bank number rather than the bank address. Status bits such as read or write indications are stored in field 34. An identifier for the source of the request is stored in source field 36.

Other fields are loaded after the bank's state machine, row counter, and row address are consulted. If the new row address of the request being loaded into request queue 26 matches the row address of the last access, which is stored in row-address register 14, then ROW_HIT bit 38 is set; otherwise it is cleared to indicate that the old row must be closed and a new row address strobed in.

The DRAM state machine 10 of the decoded bank is consulted to determine if the row is active (open) or inactive (closed). RAS is effectively "low" and the row active for states 96, 98, 99. When RAS is "low", bit ROW_ACTIVE 39 is set. The row counter 12 is also consulted for the decoded bank, and ROW_OLD is copied to ROW_OLD bit 35 in request queue 26.

Figure 6:
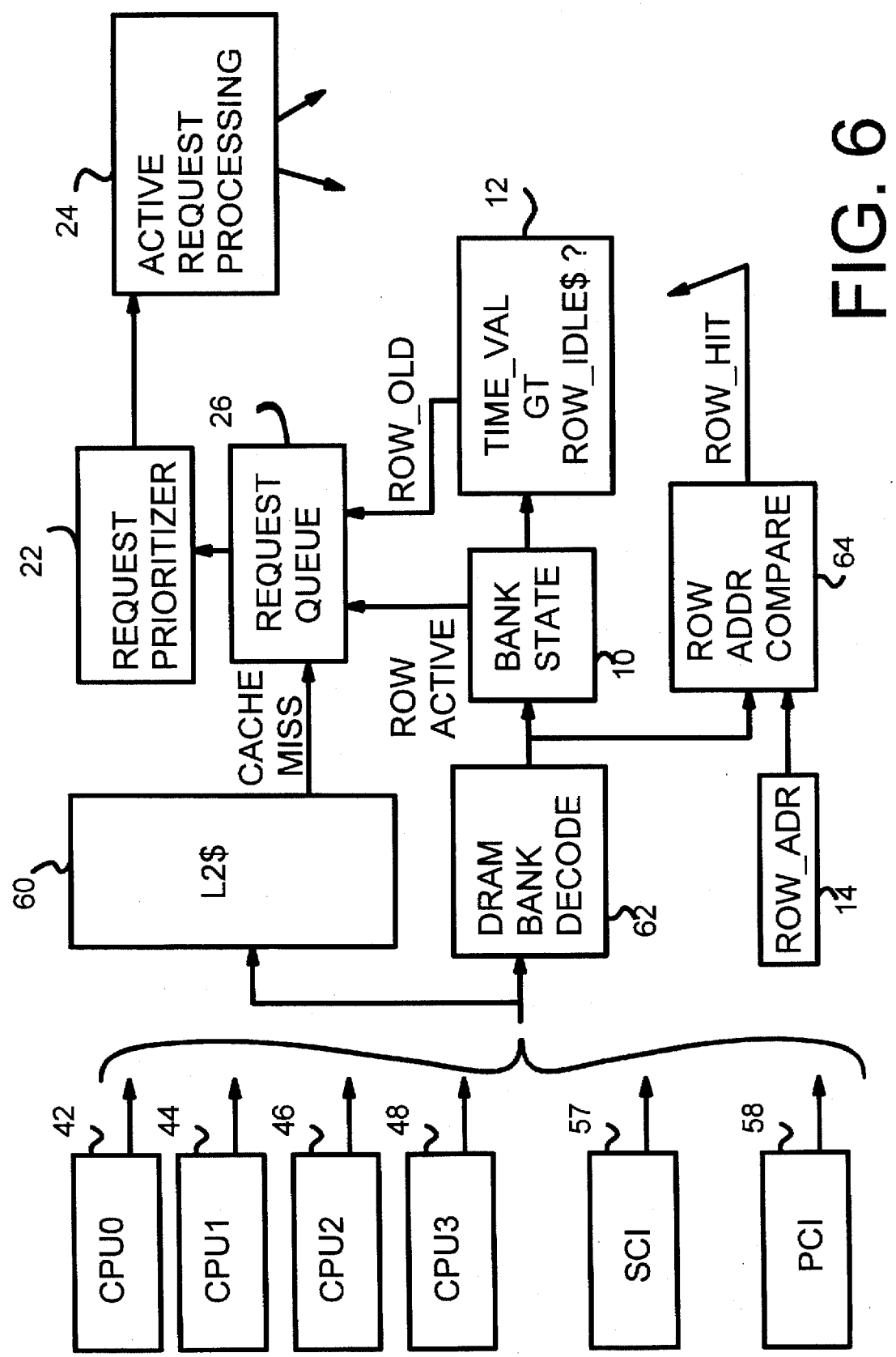
FIG. 6 is a diagram showing that the status of the DRAM row is determined while the cache is determining if a cache hit or miss has occurred.

Row Status Looked-Up During Cache Access—FIG. 6

FIG. 6 is a diagram showing that the status of the DRAM row is obtained while the cache is determining if a cache hit or miss has occurred. Requests from CPU cores 42, 44, 46, 48, and requests from SCI 57, and PCI interface 58 are sent to second-level cache 60 to determine if the data requested is present in the on-chip cache. At the same time as the cache lookup, before the cache hit or miss has been determined, the request's address is decoded by bank decoder 62 to determine which DRAM bank contains the data. The decoded bank's state machine 10 and row-address register 14 are then selected. Row address comparator 64 signals ROW_HIT if the new row address of the request matches the row address of the last access, stored in register 14. ROW_ACTIVE is signaled by DRAM state machine 10 if the current state has the RAS signal active (low).

Row counter 12 of the decoded bank is also consulted to determine if the row has been open for a long period of time without a recent access. ROW_OLD is signaled for such as stale row. These row status signals, ROW_HIT, ROW_ACTIVE, and ROW_OLD, are loaded into request queue 26, possibly before cache 60 has determined if a hit or a miss has occurred. Should a cache hit occur, the row status information is simply discarded since cache 60 can supply the data without a DRAM access.

The bank status information in request queue 26 is updated when the status of a bank changes. Alternately, the bank's status may be read during each prioritization cycle, or as each request is processed.

Request prioritizer 22 then examines the pending requests in request queue 26 to determine which request should be processed next by request processor 24. Request prioritizer 22 often processes requests in a different order than the requests are received in order to maximize memory performance.

In the preferred embodiment, request prioritizer 22 attempts to group requests to the same row together. Requests to the row with the most requests are processed before requests to other rows with fewer requests.

Prioritizer Re-Orders Requests

Request prioritizer 22 re-orders the requests to maximize memory bandwidth. Bandwidth can be increased by reducing the number of row misses: requests to a row other than the open row. The prioritizer searches pending requests in request queue 26 and groups the requests together by bank and row. Any requests to a row that is already open are processed first. These requests to open rows are rapidly filled since the RAS precharge and opening delays are avoided.

Row hits are requests to rows which are already open. Row-hit requests are re-ordered and processed before other row-miss requests. The row-miss request may be an older request which normally is processed before the younger row-hit request. However, the older row-miss request requires closing the row that is already open. If this row were closed, then the row-hit request would require spending additional delay to precharge RAS and open the row again.

Once all of the row-hit requests have been processed, only row-miss requests remain. Any requests to banks with RAS inactive (ROW_ACTIVE=0) are processed first, since no row is open. Then row-miss requests to banks with open rows are processed. The row counter is used to determine priority of these requests: any row-miss requests that have ROW_OLD active are processed before requests with ROW_OLD inactive, so that stale rows are closed before more-recently accessed rows are closed. The lowest priority request is a row-miss to a bank with a recently-accessed row open. Recently-accessed banks are likely to be accessed again, and thus a delay in closing the bank may allow a new request to that open row to be received and processed before closing the row to process the row-miss request.

The pending requests are processed in this order:

DRAM Refresh Request

Row-Hit Request

Row-Miss Request to Bank with Row Closed

Row-Miss Request to Bank with Row Open, ROW_OLD=1

Row-Miss Request to Bank with Row Open, ROW_OLD=0

Thus a recently-accessed bank with ROW_OLD=0 is left open as long as possible because any row-miss request to this bank is given the lowest priority. When multiple requests have the same priority, then requests in a group having a larger number of individual requests to a row are processed before smaller groups of requests.

When multiple requests are pending to the current row, then these requests are processed before other requests to other rows. Efficient CAS-only cycles are used. When there is only one request to the current row, then an auto-precharge CAS cycle is performed to precharge the row as soon as possible. Auto-precharge is a special type of CAS cycle whereby a row precharge is requested immediately after the data has been internally read from the RAM array, even before the data has been bursted out of the DRAM chip. Auto-precharge is supported by some synchronous DRAM's, allowing row precharge to begin before the data has been completely transferred out of the DRAM chip.

When determining which bank to access next when multiple requests are to different banks, the row having the most pending requests is selected first. This way more requests are satisfied in a shorter time, since more CAS-only cycles may be used. It also allows more time for requests to other rows to accumulate, increasing the number of data bursts using CAS-only cycles.

When only one request is pending to the current row, and no other requests are pending, then the row is left active. After a certain, predetermined number of clock cycles when the row is idle, the row is precharged. Precharging the row causes accesses to the old current row to take an additional 3 cycles since the old row is closed, but accesses to other rows to take 3 fewer cycles than when the current row is left open. The longer that a bank is idle, the less likely it is to receive a new request to the current row.

Separate Address and Data Busses to DRAM Allows Early Row Open

A single data bus is used to connect the DRAM controller to all of the DRAM's data I/O pins. All banks of DRAM share the same data bus. Thus when one bank of DRAM is bursting data, all other banks must wait to read or write data.

A single multiplexed address bus is also shared among all banks of DRAM. However, each bank has a separate CS signal, allowing a row to be open on some banks but not on other banks since RAS is only latched when CS to a bank is active. RAS, CAS and write-enable (WE) signals are normally shared but sometimes separate signals are provided for different banks or bytes of data.

Figure 7:
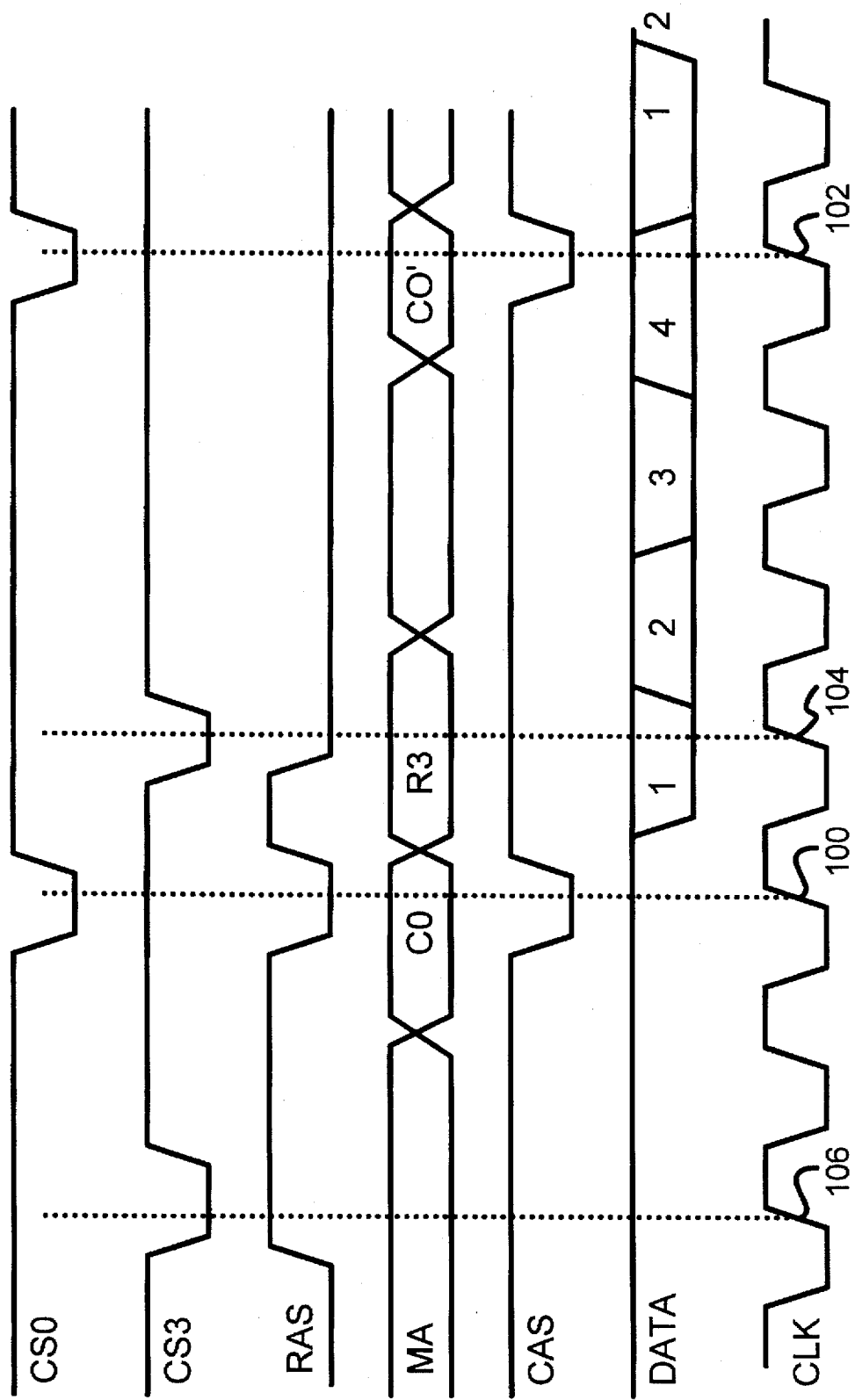
FIG. 7 is a waveform showing a row being opened on one bank while a different bank is bursting data.

Since the address and data buses are separate, it is possible to strobe in a row or column address to one bank while a different bank is bursting data. FIG. 7 is a waveform showing a row being opened on one bank while a different bank is bursting data. The prioritizer first selects a row-hit burst of data to bank 0 followed by a second row-hit to bank 0. The multiplexed address (MA) bus is first driven with the first column address C0, which is strobed in to bank 0 by rising edge 100 of CLK when CAS and CS0 are low. Data from this column address and the following three addresses are burst out to the data bus on successive clock cycles.

Before all four data items are burst out of the DRAM onto the data bus, the next row-hit access begins by driving the second column address C0' onto the multiplexed address bus. This second column address C0' is strobed into the DRAM chips in bank 0 on rising edge 102 of CLK, when CAS and CS0 are low. These same DRAM chips are bursting out data for the previous column address C0. Pipelining within the DRAM chips allows data to be bursted out while a new address is being strobed in.

When the burst length is programmed to larger values, such as a burst of four or eight, more time is required from the data bus than from the address bus for row-hits. Thus spare bandwidth is available on the address bus.

FIG. 7 shows that some of this spare bandwidth on the address bus can be used to strobe in a new row address to a different bank. At clock edge 106, the RAS to bank 3 is pulled high when CS3 is low, closing the row on bank 3. Perhaps a refresh has occurred for bank 3, or a request for bank 3 has begun to precharge RAS before bandwidth is available on the data bus. While data is being bursted out of bank 0 for column address C0, RAS and CS3 are asserted for bank 3. Rising edge 104 of CLK when RAS and CS3 are low causes a new row address R3 to be latched into bank 3. Since the data bus is busy, bank 3 cannot yet burst out data. However, by strobing the row address into bank 3 during the idle time of the multiplexed address bus, the latency to get the data from bank 3 is reduced to a simple CAS burst. The CAS burst can occur at a later time when the data bus is not busy.

The spare bandwidth on the multiplexed address bus is well-distributed. Each CAS-only burst cycle requires 4 cycles of the data bus to burst the data, but only 1 cycle of the address bus to strobe in the column address. Row-miss cycles require at least 2 cycles of the address bus, so less bandwidth is available when many row-miss cycles occur with few row-hit cycles. Typically at least 40% of all requests are row-hits while 60% or less are row misses.

Speculative Row Open Before Cache Hit is Signaled

Since spare bandwidth is available on the multiplexed address bus, speculative operations that use only the address bus do not reduce the overall data bandwidth. A new row can be opened as a speculative operation before it has been determined if the data is available in the cache. Since the memory controller begins to look up the bank's status in parallel to the cache access, it may be known that the row is inactive before the cache has completed the lookup. There is little harm in opening the row early when the row is closed. Even if the cache hits, future requests may be made to this same DRAM row, and thus a future request's latency may be reduced. However, future requests to other rows may experience a higher latency.

Should the cache miss, then the data can be retrieved from the DRAM bank with less latency since the row was opened during the cache look-up. Thus a speculative row open of a bank with the row inactive is desirable. The amount of time before an idle row is closed may be decreased for speculative requests relative to demand requests.

When a row is active, it is usually not prudent to switch to the new row for a speculative operation. However, once the cache determines that a cache miss has occurred, then the speculative operation becomes a demand operation and is processed as described before. An speculative/demand bit is added to each entry in request queue 26 to indicate if the request is speculative, before cache look-up, or demand, after cache look-up. New requests are then loaded into request queue 26 as a speculative request in parallel to the cache look-up. After cache look-up the speculative request is changed to a demand request by inverting the speculative/demand bit when a cache miss occurs, but is deleted on a cache hit. Speculative requests do not pulse CAS or burst data since this would permanently alter the data for a write.

Another useful speculative cycle is to close a row that has not been recently accessed and open a new row. The row counter signals ROW_OLD when a row is opened but has not been accessed for a programmable period of time. Thus ROW_OLD can be used to determine if a speculative request should open a new row. When ROW_OLD is high, a new row is opened and the old row is closed. When ROW_OLD is low, the old row has been recently used and the new row is not opened for the speculative request.

Instead any speculative requests with ROW_OLD low are deleted or not acted upon until the cache look-up completes.

Thus the row counter is used to determine if a speculative request should open a new row. All speculative requests have a lower priority than other demand requests, but since the speculative requests never use the data bus (until they are converted to demand requests), the speculative request may be processed ahead of other requests waiting for the data bus.

A comparator may be used to compare the bank of the speculative address to other requests in the request queue. If any other demand request has the same bank address, then the speculative request is deleted to avoid interference with the demand request.

FIG. 8 is a timing diagram of SDRAM accesses using normal and auto-precharge. The symbols in FIG. 8 are:

P start of a row precharge

R Assert RAS and strobe in Row address

C Assert CAS and strobe in column address

A Assert CAS, strobe in column address, and request auto-precharge

0 First data of burst on data bus

1 Second data of burst on data bus

2 Third data of burst on data bus

3 Fourth data of burst on data bus

- Idle cycle on address bus

In case (A), new requests are received too late to perform an auto-precharge. The next request is received after cycle 6, when CAS is asserted and the auto-precharge must be requested. The earliest a precharge can be started is in cycle 11, during the data burst. Three clock cycles are needed to precharge the next row before RAS is asserted.

In case (B), the new request is received before cycle 6 when CAS is asserted. The new request is to a different row in the bank, so a row precharge is necessary. An auto-precharge is requested when CAS is asserted for the first cycle so that the row precharge begins immediately after the data is internally read, before all the data is burst out of the DRAM chip. RAS for the new request may be asserted in cycle 11. Auto-precharge saves three cycles relative to case (A) with normal precharge.

Case (C) shows multiple requests to the same row. CAS-only cycles are performed once the row is opened by the first access. CAS-only cycles are performed every 4 cycles while auto-precharge cycles require 8 cycles, saving 4 cycles. Normal precharge cycles, as shown in case (A) require 11 cycles each.

Case (D) shows is an isolated request with no request immediately following. The row is left open for a period of time determined by the row-open counter. Once the predetermined delay has elapsed, the row is closed by performing a precharge cycle "P". A following request then does not have to wait the three cycles for the precharge.

Round-Robin To Prevent Lock-Out

When multiple sources each send multiple requests, it is possible that just one or a few of the sources could hog the DRAM, since the highest priority is given to row-hits. Sequential, consecutive accesses from one CPU core are row hits, while other CPU cores may be lower-priority row misses. Thus the CPU core with row hits would always be granted priority. The other CPU cores are locked-out, having lower priority.

This lock-out problem is solved by implementing a round-robin scheme to prevent one source from always having highest priority. Each source is allowed two accesses to a bank before any other sources are allowed to win priority. Once a source has won priority twice and other sources have pending requests, then the winning source is given a lower priority. This scheme allows all sources to access the DRAM memory so all CPU cores can make forward progress in executing their programs.

Allowing two consecutive wins provides improved performance over a more fair scheme that allows each source only one win. Since each request bursts four or eight data items, two wins provides a large amount of data. The second request from the same source often is to the same row, so a more efficient row-hit cycle is executed when two consecutive wins are allowed.

The round-robin scheme preferably selects sources having the same bank and row before passing priority to a source with a different row. This modification to a simple round-robin scheme improves efficiency because different sources requesting the same row are processed before other sources. Processing together both sources requesting the same row results in more row-hit cycles occurring, improving performance.

Memory Ordering

While requests from different sources or CPU cores can be re-ordered, requests from the same source often must be processed in exactly the same order received.

Strong memory ordering requires that fetches and stores be processed in the exact order received from any one CPU core. However, requests from different sources may be freely mixed or re-ordered. Re-ordering requests from different CPU cores provides a great deal of potential for improving performance.

A relaxed memory ordering allows fetches to be re-ordered with respect to stores, but stores must be processed in the exact order requested from any one CPU core. Relaxed memory ordering provides even more opportunity for performance improvement by combining requests to the same row.

Weak memory ordering allows fetches and stores to be freely re-ordered. Stores may be re-ordered with respect to one another too. Some form of memory synchronization instruction is needed for weak memory ordering. SCI requests to other processor elements are always strongly ordered.

ADVANTAGES OF THE INVENTION

Requests from multiple processors are re-ordered to maximize DRAM row hits and minimize row misses. Increasing the number of row hits relative to row misses increases performance since row hits are processed in fewer clock cycles than row misses.

The request queue provides a convenient mechanism for storing row-status information such as the state of the row and whether the request is a row hit or a row miss. The burst counter is not used during idle times and thus is available for a timer indicating the time since the last access to that bank when the row is active. Thus the burst counter serves a second purpose of determining when a row becomes stale. Information on which rows are less-recently accessed is useful for deciding when to replace the open row.

Figure 9:
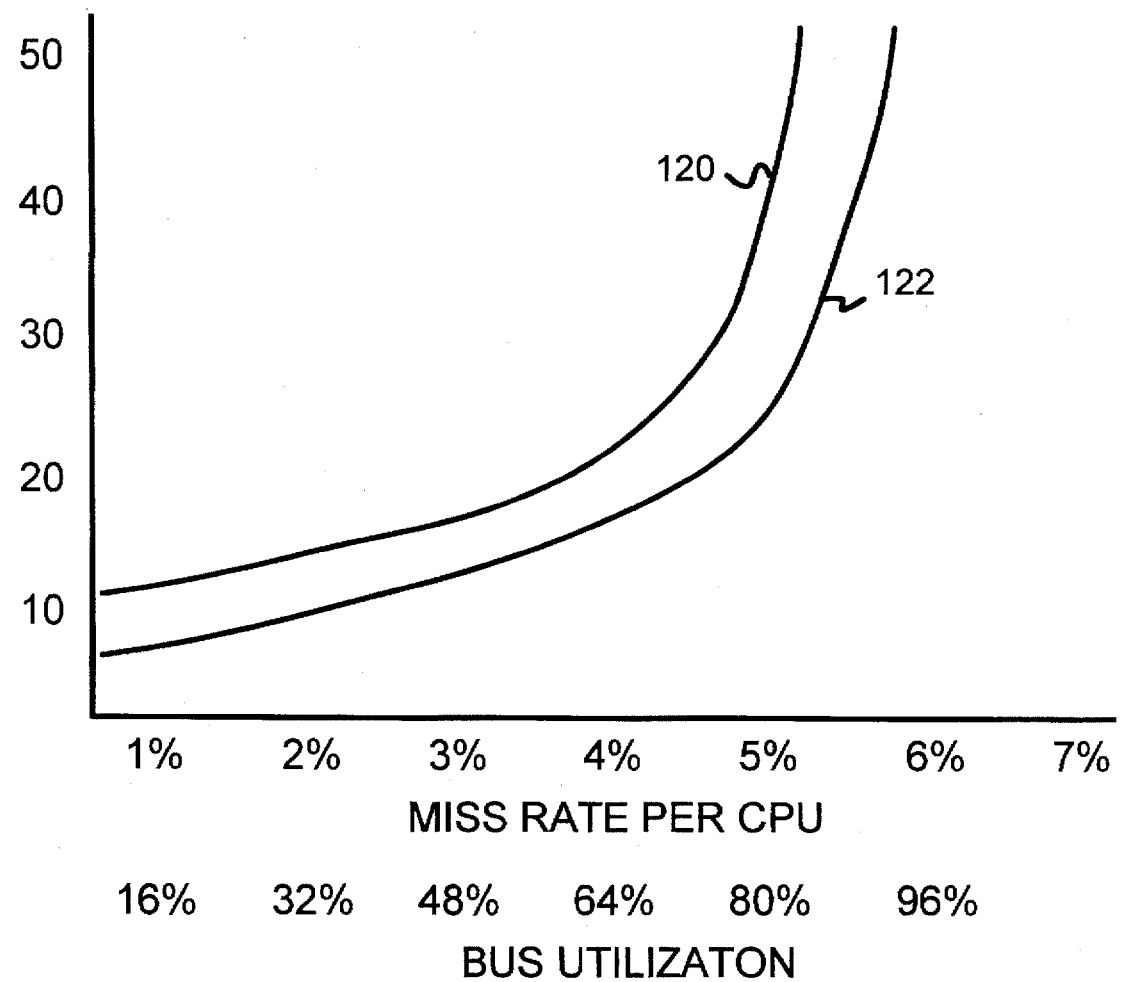
FIG. 9 highlights a decrease in average latency when using request re-ordering.

Spare address bus bandwidth is used for speculative row-opening before the internal cache status is known. FIG. 9 highlights a decrease in average latency when using request re-ordering. The average latency to satisfy a request, in clock cycles, is plotted for a 150 MHz memory bus as a function of the miss rate for each CPU core. As the miss rate per CPU increases, additional accesses to the external DRAM are needed, and the bus utilization increases. Multiple requests from the multiple CPU cores cause some requests to wait until another request is processed. Thus average latency increases as the bus traffic increases. Simple re-ordering using a four-deep re-order buffer results in curve 120. Re-ordering by grouping requests to the same row, and produces curve 122. The improved re-ordering of curve 122 results in reduced average latency for any given miss rate. For example, at a 5% miss rate per CPU for a die with four CPU cores, average latency is reduced from 40 cycles to 23 cycles. Thus row-based re-ordering improves average latency.

The data for FIG. 9 was generate by assuming 40% of requests are row hits, 50% are row misses to the same bank, and 10% are misses to another bank. Row-hits are re-ordered and processed before row misses.

ALTERNATE EMBODIMENTS

Several other embodiments are contemplated by the inventors. For example the DRAM chips can be of many different depths and widths, and provide various features. These DRAMs are typically arranged on SIMM modules, and each SIMM module can contain two or more banks. The external memory is preferably 64-bits in width, which can be constructed from these SIMMs in a conventional manner. Other data-bus widths, such as 128 bit or 32 bit, are also possible.

Additional buses, such as an AT or ISA bus may be attached to the PCI bus. Other internal buses may be added within the multi-processor IC, and the internal arrangement of busses, caches, and CPU cores may vary from the typical embodiment described herein. The number of CPU cores on a multi-processor IC may also vary. While the invention has been described in reference to re-ordering of requests to a DRAM memory, requests to other external devices may also be re-ordered.

While the processor clock has been described as the clock for the DRAM controller, high-speed processors often use a faster clock for the processor core than for the memory. Thus a slower or divided-down clock is often used as a memory clock for DRAM access.

The row-hit, row-active, and row-old bits in the request queue may be combined together or encoded in many ways. These bits may also be combined with other fields or bits. The bits can be inverted as stored so that either a one or a zero indicates that the active state is set while the opposite value indicates that the bit is reset or cleared. The row-active indication may be encoded with the state of the state machine such that no single bit indicates RAS low.

A second address bus may be used for accessing half of the DRAM banks. The second address bus allows for two simultaneous row-open commands to be processed at the same time, although the system is still limited by one data bus and can only process one CAS command at a time.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A memory controller for accessing an external memory in response to requests from a plurality of general-purpose processors, the memory controller comprising:

a plurality of bank controllers, each bank controller for accessing a bank of the external memory, each bank controller comprising:

a state machine for sequencing control signals for timing access of the external memory, the state machine outputting a row-active indication of a RAS signal line coupled to the bank of the external memory when the last access to the bank occurred;

a row address register for storing a last row address of a last-accessed row of the bank of the external memory;

a counter, including reset means for resetting the counter upon completion of a data-transfer access to the bank of the external memory, the counter periodically incrementing when the row is active and no data-transfer access occurs, the counter outputting a stale-row indication when a count from the counter exceeds a predetermined count;

a request queue for storing requests from the plurality of general-purpose processors for accessing the external memory, the request queue storing row-status bits including:

a) a row-hit indication when the last row address matches a row address of a request, b) the row-active indication from the state machine, and c) the stale-row indication from the counter; and a request prioritizer, coupled to the request queue, for determining a next request from the request queue for generating a data-transfer access to the external memory, the request prioritizer re-ordering the requests into an order other than the order the requests are loaded into the request queue, whereby requests from the plurality of processors are re-ordered for accessing the external memory.

2. The memory controller of claim 1 wherein the counter is incremented by a slow clock having a frequency divided down from a memory clock for incrementing the state machine when the row is active and no data-transfer access occurs, the counter being incremented by the memory clock during the data-transfer access, whereby the counter increments more slowly when no data-transfer occurs than when a data-transfer access is occurring.

3. The memory controller of claim 2 wherein the predetermined count for determining the stale row indication is programmable.

4. The memory controller of claim 2 wherein the request prioritizer includes means for re-ordering requests having the stale-row indication before requests not having the stale-row indication when no requests have the row-hit indication, whereby miss requests to stale rows are processed before miss requests to more-recently-accessed rows.

5. A multi-processor integrated circuit (IC) comprising:

a first CPU core for processing general-purpose instructions;

a second CPU core for processing general-purpose instructions;

a shared cache for supplying data and instructions to the first CPU core and to the second CPU core;

a DRAM controller, coupled to the shared cache, for processing miss requests from the shared cache which originated from the first CPU core and from the second CPU core;

the DRAM controller including:

last row-address means for storing a plurality of last row addresses indicating row-addresses for a recent access of a DRAM bank;

row-address compare means, coupled to the last row-address means, for signaling a row-hit when a match is detected;

sequencing means for generating RAS, CAS, and address signals to DRAM banks;

request prioritizer means, coupled to the row-address compare means, for determining an order of processing for requests from the first CPU core and the second CPU core, the request prioritizer means including means for processing a second request from the second CPU core before a first request from the first CPU core when the row-hit is signaled for the second request but not for the first request;

a plurality or row timers, coupled to the request prioritizer means, for indicating a number of clock periods since a last access to a DRAM bank, the row timers including means for resetting when an access occurs to the DRAM bank, wherein row timers having a lower count indicate a more-recently-accessed DRAM bank than row timers with a higher count, whereby row-hit requests are processed before row-miss requests from different CPU cores.

6. The multi-processor IC of claim 5 wherein the DRAM controller further comprises:

round-robin means, coupled to the request prioritizer means, for allowing a limited number of requests from the second CPU core to be processed when requests from the first CPU core are pending.

7. The multi-processor IC of claim 6 wherein the limited number of requests is two.

8. The multi-processor IC of claim 7 wherein the requests are burst requests comprising a number of clock cycles, with different data being transferred on a data bus between the DRAM bank and the multi-processor IC for successive clock cycles when processing a burst request.

9. The multi-processor IC of claim 5 wherein the request prioritizer means includes means for processing a request to a more-recently-accessed DRAM bank before a request to a stale DRAM bank.

10. A method of queuing requests from multiple processors to a shared memory, the method comprising the steps of:

receiving a request from a processor, the request having a request-address;

loading the request-address into a request queue;

decoding at least a portion of the request-address to determine a decoded bank of the shared memory containing data at the request-address;

comparing a row-address portion of the request-address to a stored row address for the decoded bank, the stored row address being a last row address strobed into the decoded bank for selecting a row from among a plurality of rows of memory cells in the decoded bank;

signaling a row match when the row-address portion of the request-address matches the stored row address;

setting a row-match bit for the request in the request queue when the row match is signaled;

determining when a period of time since a last access occurred to the decoded bank exceeds a predetermined period of time and signaling a stale row when the period of time since the last access exceeds the predetermined period of time;

setting a stale row bit for the request in the request queue when the stale row is signaled;

prioritizing requests in the request queue from different processors wherein priority is a function of the stale row bit and row-match bit for each request in the request queue, whereby priority of requests from different processors is a function of the period of time since the last access of the decoded bank and the row-match.

11. The method of claim 10 further comprising:

determining when a row in the decoded bank is in an inactive state;

ignoring the row-match bit when determining priority for the request when the row is in the inactive state.

12. The method of claim 10 further comprising:

periodically incrementing a counter to periodically increment the period of time since the last access to the decoded bank;

resetting the counter when an access to the decoded bank occurs;

reading the counter to determine the period of time since the last access to the decoded bank, whereby the counter indicates the period of time since the last access to the decoded bank.

13. The method of claim 10 further comprising:

marking a request loaded into the request queue as speculative when a shared cache has not yet determined that the data at the request-address is present in the shared cache;

marking the request loaded into the request queue as demand when the shared cache determines that the data at the request-address is not present in the shared cache;

canceling the request loaded into the request queue when the shared cache determines that the data at the request-address is present in the shared cache, whereby the request queue is loaded before the shared cache is accessed.

14. The method of claim 13 wherein requests marked as speculative are assigned a lower priority than requests marked as demand.

15. The method of claim 14 further comprising:

pulsing a CAS signal to the decoded bank and strobing in a column-address portion of the request-address when the request is processed when the request is marked as demand;

not pulsing CAS for any request marked as speculative, but pulsing RAS and strobing in a new row address for requests marked as speculative, whereby speculative requests strobe in a new row address but do not strobe in a new column address.

16. The method of claim 15 further comprising:

processing requests having the row-match bits set with a first row-address in a decoded bank before processing requests to other row-addresses in the decoded bank with the row-match bits cleared, whereby row-matches are processed before row-misses.

17. The method of claim 10 further comprising:

processing requests having the row-match bit indicating a row miss by processing requests with the stale-row bit set before requests with the stale-row bit not set, whereby stale rows are replaced before rows which have been recently accessed.

18. The method of claim 17 further comprising:

preventing a processor from winning priority and being processed for more than two access transactions when other processors have requests in the request queue, whereby other processors are given priority after two accesses by a winning processor.

19. The method of claim 18 wherein the access transactions each comprise a CAS pulse wherein a column address is strobed into the shared memory and a data burst of multiple cycles with sequential data being transferred to a data bus on successive clock cycles, whereby access transactions are burst transactions.

* * * * *